Feb. 3, 1931.  H. SYNCK  1,790,730
ATTACHMENT FOR MANURE SPREADERS
Filed Aug. 10, 1928
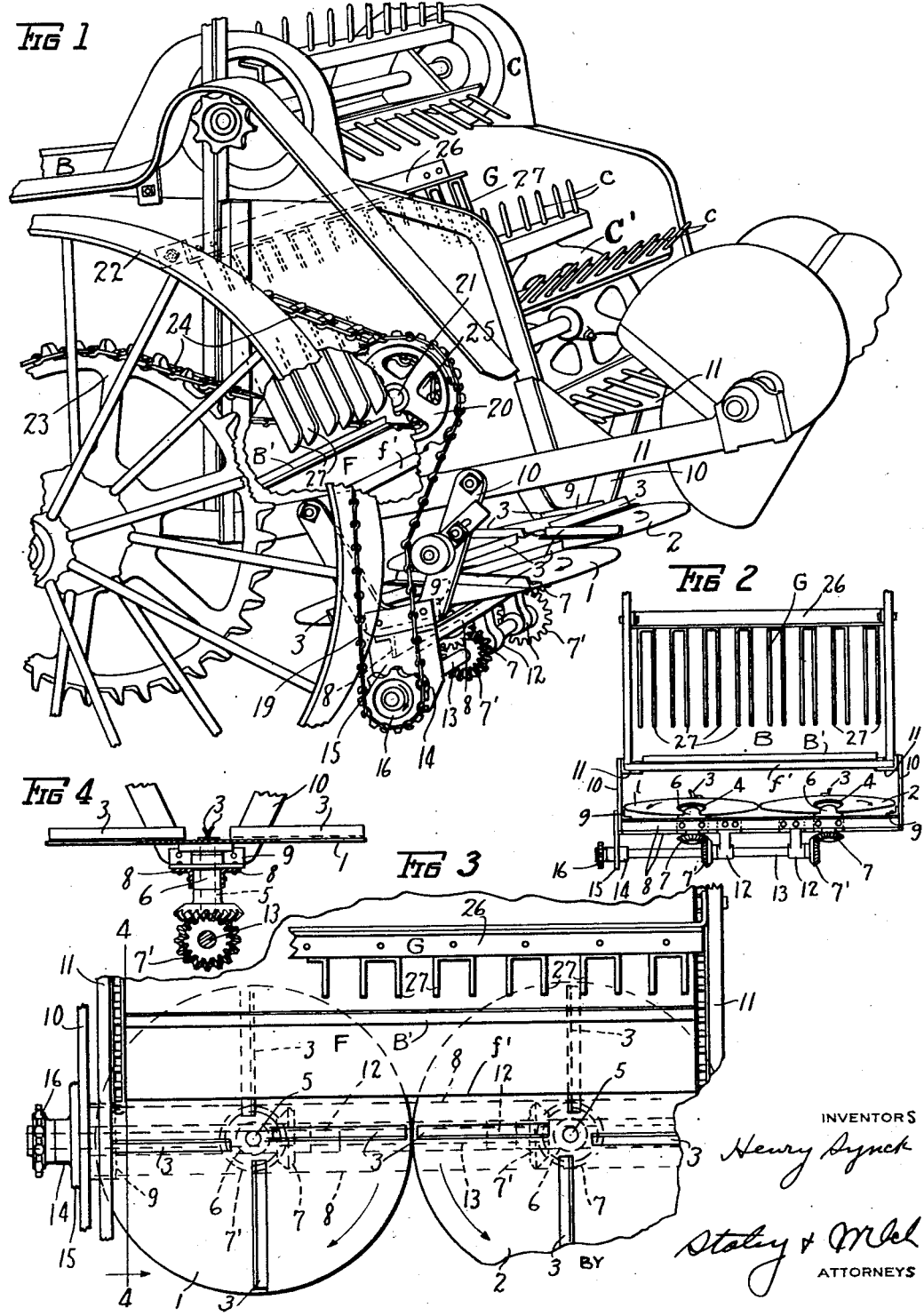
INVENTORS
Henry Synck
Staley & McOel
ATTORNEYS Patented Feb. 3, 1931

1,790,730

UNITED STATES PATENT OFFICE

HENRY SYNCK, OF COLDWATER, OHIO, ASSIGNOR TO THE NEW IDEA SPREADER COMPANY, OF COLDWATER, OHIO, A CORPORATION OF OHIO

ATTACHMENT FOR MANURE SPREADERS

Application filed August 10, 1928. Serial No. 298,660.

This invention relates to a distributor attachment for manure spreaders for the broadcast sowing or spreading of fertilizer material, such as pulverized lime or limestone; manure which is free from fibrous bedding material such as straw; marl; or other similar fertilizer material which is either finely subdivided or can be readily rendered so by the breaking or pulverizing devices of the spreader.

An object of the invention is to provide a device of the character referred to which may be readily attached to a manure spreader of the conventional type with the minimum of alteration to the existing parts and which will be simple in construction and effective for the purpose for which it is designed.

In the accompanying drawings:

Fig. 1 is an enlarged perspective view of a portion of the rear end of a manure spreader, with the invention applied thereon.

Fig. 2 is a rear end view, in reduced scale, of the bed only of the spreader, showing the attachment applied thereto.

Fig. 3 is a top plan view, on a larger scale.

Fig. 4 is a section on the line 4—4 of Fig. 3.

The attachment is constructed and applied as follows: 1 and 2 are revoluble scattering disks, preferably of sheet metal, on which are a plurality of radially positioned scattering vanes 3. Each disk is secured to a hub 4 which is in turn fixed on a shaft 5 journaled in a bearing 6, and on the lower end of the shaft 5 is fixed one of a pair of mating bevel gears 7. The bearings 6 are secured to a pair of parallel spaced-apart bars 8, preferably of angle steel, the ends which are secured by means of angle brackets 9 to U-shaped members 10 secured to the extending portions 11 of the frame of the spreader.

Bearings 12 extend downwardly from the bars 8, in which is journaled a shaft 13, having fixed thereon the other gears 7' of the mating bevel gears, said gears 7' being so placed as regards the gears 7, that rotation of the shaft causes the disks 1 and 2 to revolve towards each other, or clockwise, referring to disk 1, and anti-clockwise, for disk 2, viewed from the rear of the spreader. The end of the shaft 13 is journaled in a bearing 14, supported by means of a plate 15 depending from one of the U-shaped members 10, and on the end of the shaft is a sprocket 16.

In operation the device is attached at the desired points, so that the centers of the disks 1 and 2 are near the rear edge f' of the floor F of the body of the manure spreader. The attachment is operated from the manure spreader and in the present case a chain 19 connects the sprocket 16 with the usual sprocket 20 on the shaft 21 of the usual lower beater cylinder C. The chain 19 is preferably the one which ordinarily is employed to drive the upper beater cylinder C although an entirely new chain may be substituted if it is found that the old chain is not suitable. This cylinder C is driven in the usual way from one of the ground wheels 22 through the sprocket wheel 23, chain 24 and sprocket 25 on the beater shaft 21; the chain 24 passing about a series of idler sprocket wheels (not shown) and having provision for throwing it into and out of engagement with the sprocket wheel 23 in a well known way.

The material to be broadcast is loaded into the bed B of the manure spreader and conveyed to the rear of the bed bottom by means of an endless conveyer B' of the usual well known form, where it drops between the rear end of the bed bottom and the main or lower pulverizing cylinder C' to the disks 1 and 2 which rapidly revolve as the spreader advances and broadcasts the material over the ground.

In order to insure a uniform flow of some kinds of material to the disks, such as pulverized lime or limestone, it being a characteristic of such materials to pack and drop intermittently in comparatively large quantities, a grating G, inclined from front to rear, consisting of a bar 26 to which a series of spaced apart arms 27 are secured, is attached within the bed B, the arms terminating sufficiently high above the floor F to permit the passage thereunder of the conveyer, and at a distance towards the front from the edge $f'$.

In the sowing of fine manure, pulverized lime or limestone, or materials of that kind, the pulverizing cylinder C' ordinarily performs no function, because the material practically all drops before it reaches the teeth of the cylinder. In the broadcasting of material such as marl, however, which is earth having a considerable proportion of clay, or other material that holds enough together to come in contact with the pulverizing cylinder as it is fed up, this cylinder acts to disintegrate this material into a finely subdivided condition, before dropping. In the broadcasting of such material the grating G is not installed, as this grating would interfere materially with the proper flow of such material.

By this arrangement a very simple and effective attachment is provided for the conventional form of manure spreader which may be readily applied to the spreader or removed therefrom. By having the scattering disks closely adjacent and extending the full width of the spreader bed, the material can be dropped from the full width of the bed in a uniform manner by the usual endless carrier employed in manure spreaders. The arrangement is further such that the space between the end of the spreader bed and the disks is entirely unobstructed by reason of the fact that the devices which drive the disks are located entirely beneath the disks. The arrangement also provides a simple and effective means for driving the scattering disks from the mechanism of the manure spreader, i. e., preferably from the lower beater shaft as shown or from the shaft of the upper beater shaft of the distributor, or any relating part of the machine.

While I have shown the preferred construction for carrying out my invention, it is to be understood that the scope of the invention is not necessarily limited to the exact construction and arrangement shown and described.

Having thus described my invention, I claim:

1. In an attachment for manure spreaders of the type which has an endless carrier moving over the bottom of the bed of the same and a rotatable pulverizing cylinder located rearwardly thereof, a support, a pair of scattering disks revolubly mounted edge to edge on the upper side of said support, said scattering disks having their edges in close proximity and extending substantially throughout the width of the bed, a portion of said scattering disks being arranged directly beneath the end of the bed bottom, with the major portion of said scattering disk located rearwardly of the end of said bed bottom to receive material as it drops directly thereon between the rear end of the bed bottom and the pulverizing cylinder, rotatable devices located on the under side of said support having an operative connection with said disks to rotate the same in opposite directions, and means for rotating said devices from the operating mechanism of the spreader.

2. In combination with a manure spreader having a body open at its rear end, a conveyer for moving material toward the rear end thereof, and a rotatable pulverizing device located to the rear of said body, of a sowing attachment for said spreader comprising a support, means for removably connecting the same to the rear end of the body, a pair of substantially horizontally arranged side by side scattering disks extending across the greater part of the width of said bed and partly underlying the discharge end of said conveyer, said disks being also positioned so that fine material discharged from said conveyer will fall freely to the disks between the discharge end of the conveyer and the pulverizing device, and means for rotating said disks from established operating mechanism of the spreader.

3. In combination with a manure spreader having a body open at its rear end, a conveyer for moving material toward the rear end thereof, and a pulverizing device located to the rear of said body, of a sowing attachment for said spreader comprising a support, means for removably connecting the same to the rear end of the body, a pair of substantially horizontally arranged side by side scattering disks extending across the greater part of the width of said bed and partly underlying the discharge end of said conveyer, said disks being also positioned so that fine material discharged from said conveyer will fall freely to the disks between the discharge end of the conveyer and the pulverizing device, a vertical shaft connected with each disk, a horizontal shaft geared to said vertical shafts, and means for driving said horizontal shaft from the established operating mechanism of the spreader.

4. In a manure spreader including the spreader bed open at its rear, a horizontal pulverizing cylinder arranged at the rear end thereof, a support together with means for connecting the same to the rear end of the spreader and beneath the horizontal plane of the bottom of the same, a pair of scattering disks revolubly mounted side by side beneath the rear end of a bed and held by said support to receive and broadcast material dropping directly thereon between the open rear end of the bed bottom and the horizontal pulverizing cylinder, said disks being so positioned with relation to the rear end of the bed bottom as to directly receive all of the material dropping from the rear end thereof, and rotatable devices having an operative connection with said disks, said devices including means for connecting the same with the operating mechanism of the spreader.

5. In a manure spreader including the spreader bed open at its rear, a horizontal pulverizing cylinder arranged at the rear end thereof, a support together with means for connecting the same to the bed of the spreader adjacent the rear end and beneath the horizontal plane of the bottom of the spreader, a pair of scattering disks revolubly mounted side by side and held by said support with adjacent portions of their edges in close proximity, the disks extending across substantially the entire width of said bed to broadcast material dropping directly on said disks from the rear end of the bed bottom, said disks being so positioned with relation to the rear end of the bed bottom as to directly receive all of the material dropping therefrom, and rotatable devices having an operative connection with said disks carried by said support to rotate the disks and including means for connecting the same with the operating mechanism of the spreader.

6. In a manure spreader including the spreader bed bottom, a horizontal pulverizing cylinder arranged at the end thereof, a support together with means for connecting the same to the rear end of the spreader and beneath the horizontal plane of the bottom of the same, a scattering device carried by said support and including rotatable disks to receive and broadcast material dropping directly thereon between the rear end of the bed bottom and the location of the horizontal pulverizing cylinder of the spreader, the disks of the scattering devices having adjacent portions of their edges in close proximity to each other and the said portions of the disks disposed substantially directly beneath the rear edge of the bed bottom, whereby all material dropping from the bed will fall upon the disks, and rotatable devices having an operative connection with the disks of said scattering device, said rotatable device including means for connecting the same with the operating mechanism of the spreader.

7. In combination with a manure spreader including a body open at its rear end and a conveyer for moving material rearwardly in the body and discharging the material from the open rear end of the body, a scattering device mounted adjacent the rear end of the body and including rotary disks disposed horizontally side by side below the body with their adjacent edge portions in close proximity to each other and extending beneath the body and rearwardly thereof for substantially the full width of the body, the space between the disks and rear ends of the conveyer and body being unobstructed whereby material moved rearwardly by the conveyer and discharged from the open rear end of the body will drop directly upon the scattering disks, and means for rotating said disks.

In testimony whereof, I have hereunto set my hand this 7th day of August, 1928.

HENRY SYNCK.